(12) United States Patent
Jopek et al.

(10) Patent No.: US 9,455,560 B1
(45) Date of Patent: Sep. 27, 2016

(54) CLOSURE SEAL METHOD AND APPARATUS FOR WALL MOUNT ENCLOSURE

(71) Applicants: Steve Jopek, Twinsburg, OH (US); Matthew W. Pavlik, Lyndhurst, OH (US); David William Burns, Jr., Twinsburg, OH (US)

(72) Inventors: Steve Jopek, Twinsburg, OH (US); Matthew W. Pavlik, Lyndhurst, OH (US); David William Burns, Jr., Twinsburg, OH (US)

(73) Assignee: PEPPERL+FUCHS, INC., Twinsburg, OH (US)

( * ) Notice: Subject to any disclaimer, the term of this patent is extended or adjusted under 35 U.S.C. 154(b) by 285 days.

(21) Appl. No.: 14/247,789

(22) Filed: Apr. 8, 2014

Related U.S. Application Data

(60) Provisional application No. 61/890,019, filed on Oct. 11, 2013, provisional application No. 61/946,186, filed on Feb. 28, 2014.

(51) Int. Cl.
*H02G 3/08* (2006.01)
*H02G 3/10* (2006.01)
*E06B 7/16* (2006.01)

(52) U.S. Cl.
CPC .. *H02G 3/10* (2013.01); *E06B 7/16* (2013.01)

(58) Field of Classification Search
CPC ........ H02G 3/08; H02G 3/081; H02G 3/088; H02G 3/10; H02G 3/12; H02G 3/121; H05K 5/02; H05K 5/0204; H05K 5/0217; E06B 7/16
USPC ........... 174/480, 481, 50, 58, 502, 503, 559, 174/564, 17 CT, 135; 220/3.2–3.9; 248/906
See application file for complete search history.

(56) References Cited

U.S. PATENT DOCUMENTS

| | | |
|---|---|---|
| 1,027,397 A | 5/1912 | Adam |
| 3,175,873 A | 3/1965 | Blomquist et al. |
| 3,247,312 A | 4/1966 | Adel |
| 3,346,310 A | 10/1967 | Diack |
| 3,697,723 A | 10/1972 | Winsler et al. |
| 3,707,732 A | 1/1973 | Cosper |
| 3,771,264 A | 11/1973 | Sawle |
| 3,886,686 A | 6/1975 | Urbanick |
| 3,912,348 A | 10/1975 | Seymour |

(Continued)

OTHER PUBLICATIONS

Carlon® Zip Box® Blue™ Switch and Outlet Boxes, 22 pages, © Lamson & Sessions 2006.

(Continued)

*Primary Examiner* — Angel R Estrada
(74) *Attorney, Agent, or Firm* — Fay Sharpe LLP

(57) ABSTRACT

Disclosed is a wall mount enclosure and sealing assembly for electrical devices, the enclosure comprises a housing defining an interior that is accessible from an opening in a front side and configured to support electronic equipment therein. A closure door is operatively mounted to the enclosure in a closed position to prevent outside access through the opening in the front side, the closure door including an inwardly facing portion generally facing towards the front side around all or at least a portion of a periphery of the door, the inwardly facing portion extending laterally outward of the periphery of the opening. A gasket engages at least part of the inwardly facing portion of the closure door with a seal portion or first portion pressed by the inwardly facing portion of the closure door when the closure door is in the closed position to form a seal between the front side and the inwardly facing portion of the closure door to seal the interior of the enclosure.

18 Claims, 16 Drawing Sheets

(56) References Cited

U.S. PATENT DOCUMENTS

| | | |
|---|---|---|
| 4,056,211 A | 11/1977 | Zumwalt |
| 4,057,170 A | 11/1977 | Dougherty |
| 4,134,625 A | 1/1979 | Palka |
| 4,572,240 A | 2/1986 | Van Becelaere |
| 4,579,354 A | 4/1986 | Vassallo et al. |
| 4,667,580 A | 5/1987 | Wetzel |
| 4,691,970 A | 9/1987 | Neri |
| 4,725,515 A | 2/1988 | Jurca |
| 4,857,668 A | 8/1989 | Buonanno |
| 4,888,919 A | 12/1989 | Strosberg et al. |
| 4,902,023 A | 2/1990 | Opresko et al. |
| 4,961,762 A | 10/1990 | Howeth |
| 4,988,832 A * | 1/1991 | Shotey ............... H02G 3/088 174/53 |
| 4,998,587 A | 3/1991 | Thomas |
| 5,068,493 A | 11/1991 | Benn, Sr. et al. |
| 5,079,882 A | 1/1992 | Bahout |
| 5,171,078 A | 12/1992 | Oslin et al. |
| 5,247,798 A | 9/1993 | Collard, Jr. |
| 5,296,803 A | 3/1994 | Kirby et al. |
| 5,355,627 A | 10/1994 | Katz |
| 5,464,475 A | 11/1995 | Sikes et al. |
| 5,574,254 A | 11/1996 | Mori et al. |
| 5,915,575 A | 6/1999 | Morris, Sr. |
| 5,954,411 A | 9/1999 | Katz |
| 6,007,171 A | 12/1999 | Varellas-Olree |
| 6,170,928 B1 | 1/2001 | Eardley et al. |
| 6,189,268 B1 | 2/2001 | Carr et al. |
| 6,230,907 B1 | 5/2001 | Stuart |
| 6,253,497 B1 | 7/2001 | Gekler et al. |
| 6,286,918 B1 | 9/2001 | King |
| 6,588,543 B1 | 7/2003 | Tchilinguirian |
| 6,648,750 B1 | 11/2003 | Wiseman |
| 6,669,041 B2 | 12/2003 | Almond |
| 6,733,095 B1 | 5/2004 | Rieb |
| 6,775,593 B1 | 8/2004 | Parker et al. |
| 7,111,889 B2 | 9/2006 | Pennerath |
| 7,140,618 B2 | 11/2006 | Valls, Jr. |
| 7,210,729 B2 | 5/2007 | Hammaker et al. |
| 7,423,217 B2 | 9/2008 | Pape et al. |
| 7,595,446 B2 | 9/2009 | Turcovsky et al. |
| 7,631,850 B2 | 12/2009 | Lee et al. |
| 7,777,132 B2 | 8/2010 | Ozawa et al. |
| RE41,661 E * | 9/2010 | Dinh ............... H02G 3/088 174/50 |
| 8,136,279 B1 | 3/2012 | Nearman et al. |
| 8,269,104 B2 * | 9/2012 | Choraku ............... H05K 5/061 174/50 |
| 8,519,264 B2 * | 8/2013 | Leslie ............... H02G 3/088 174/50 |
| 8,528,264 B1 | 9/2013 | Thut et al. |
| 2003/0070404 A1 | 4/2003 | Calabrese |
| 2005/0104484 A1 | 5/2005 | Landsberger et al. |
| 2007/0145871 A1 | 6/2007 | Christie |
| 2007/0169953 A1 | 7/2007 | Pape et al. |
| 2007/0169955 A1 | 7/2007 | Pape et al. |
| 2007/0194180 A1 | 8/2007 | Korcz |

OTHER PUBLICATIONS

Air Conditioning & Refrigeration Industry Sections, http://www.plasopan.com/sections/cooler-section.gif, Feb. 14, 2011, 1 pgs.
Command Series Strategic Loop Controller, type SLC1, Bailey Product Instruction, E92-530-1, Jul. 31, 1994, 4 pgs.
ES18-010-S60-Profiles-Rubber Product data sheet-Elasto Proxy, http://www.elastroproxy.com/pages/our_products/ProductDataSheet.aspx?LANG-EN-CA . . . , Feb. 14, 2011, 2 pgs.
ES16-082-S60-Profiles-Rubber Product data sheet-Elasto Proxy, http://www.elastroproxy.com/pages/our_products/ProductDataSheet.aspx?LANG-EN-CA . . . , Feb. 14, 2011, 2 pgs.
ES18-256-S60-Profiles-Rubber Product data sheet-Elasto Proxy, http://www.elastroproxy.com/pages/our_products/ProductDataSheet.aspx?LANG-EN-CA . . . , Feb. 14, 2011, 2 pgs.
Extrusion Profiles Cord Stock & Sheet Material, Newman Sanitary Gasket Company, www.newmangasket.com, Newman Sanitary Gasket Company, 2010, 4 pgs.
www.simolexrubber.com, Apr. 11, 2004, 2 pgs.

* cited by examiner

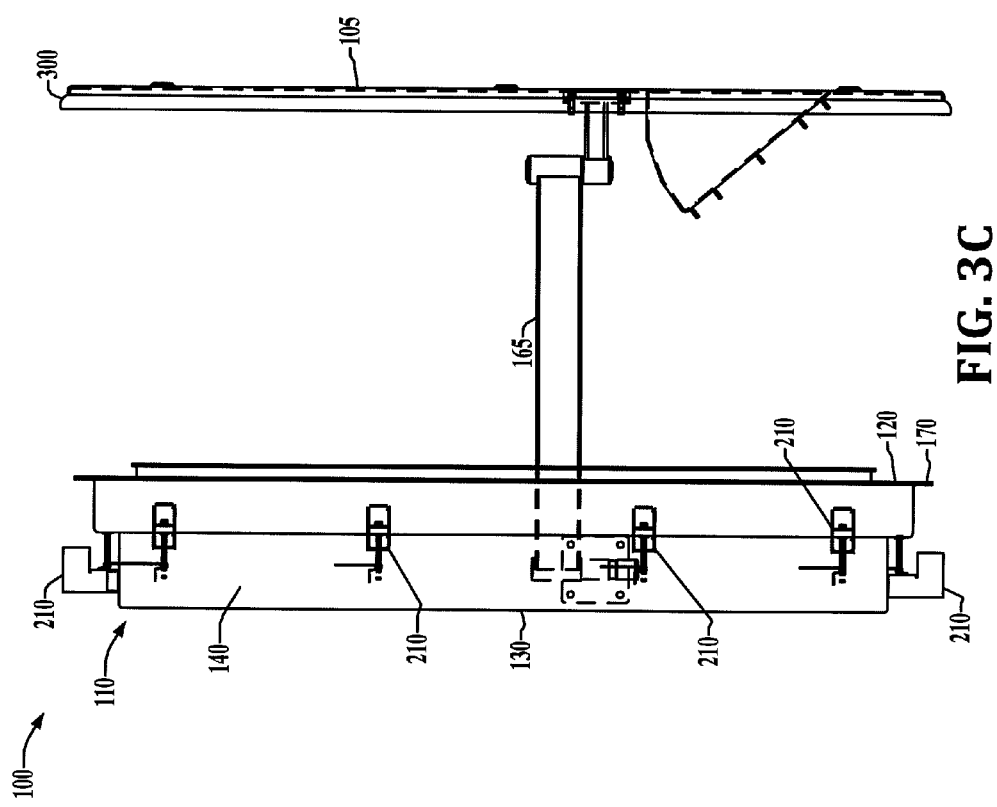

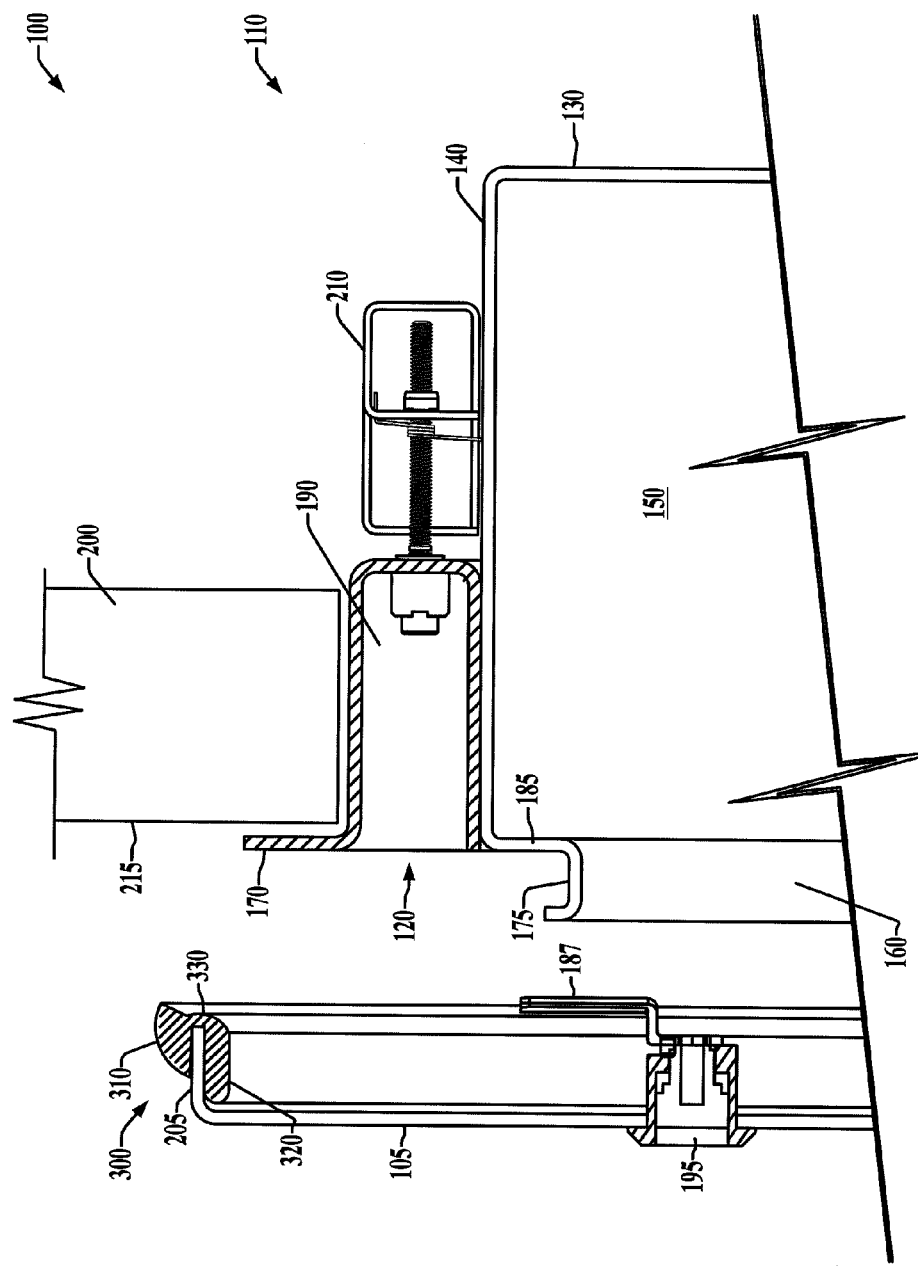

CLOSURE SEAL METHOD AND APPARATUS FOR WALL MOUNT ENCLOSURE

This application claims priority from and the benefit of U.S. Provisional Patent Application Ser. No. 61/890,019 filed Oct. 11, 2013; and U.S. Provisional Patent Application Ser. No. 61/946,186 filed Feb. 28, 2014, the entirety of each of which is hereby incorporated by reference.

BACKGROUND

The present exemplary embodiment relates to a wall mount enclosure and closure seal apparatus. It finds particular application in conjunction with enclosures and clamp mechanisms to mount a housing with electrical components to an associated substrate or structural member, and will be described with particular reference thereto. However, it is to be appreciated that the present exemplary embodiments are also amenable to other like applications.

Precise instrumentation associated with modern complex systems are sometimes required to be located in unfavorable environments. This is particularly true for electrical equipment as it is typically required that various services within building structures be provided with a means of control that remains isolated from other areas of the building. Additionally, precise instrumentation may be required in a location of a building that requires a controlled atmosphere.

Controlled atmospheres are usually a requirement of certain medical facilities or manufacturing plants to maintain a measured level of air quality in a defined location. Notably, the area within a controlled atmosphere must consistently be monitored to ensure that the necessary level of air quality is maintained. As such, it is desirable to design a controlled atmosphere with efficient use of space to reduce the possibility of unwanted air pollutants.

Many controlled atmosphere applications require that the enclosure for housing electrical devices maintain a NEMA 4× rating. This rating indicates that the enclosure is watertight (weatherproof) and can generally exclude water or moisture from entering within the housing over a period of time or while the enclosure is being cleaned by a fluid spray. Additionally, controlled atmosphere applications may require that the enclosure be generally aseptic. This means that the room, and therefore the enclosure, be generally free from pathogens or micro-organisms and/or is acceptable for use under sterile conditions.

Further, it may be desirable to provide a human machine interface (HMI) device or other related components within the controlled atmosphere, such as in an aseptic room, to allow human manipulation of a controllable system or device therein. A typical HMI device comprises electrical elements within a housing having an input device such as a keypad and an output device such as a display screen. Additionally, HMI devices include electrical hookup ports for at least one connection to associated communications interface and/or power source. However, installation of an HMI device, electrical elements or an enclosure in the controlled atmosphere may increase the risk of accumulating unwanted elements such as moisture, bacteria, dust and other air particulate that is not easily controlled or monitored within the controlled atmosphere.

The efficient use of space within a controlled atmosphere has prompted mounting of HMI devices and enclosures on or within the walls of the controlled atmosphere or to other structural members. However, these attempts either fail to reduce the risk of accumulating foreign air elements and/or fail to provide for efficient access to the enclosure for maintenance and replacement.

In one instance, an enclosure can be installed within a wall opening, the enclosure having an opening at a front side to provide access to an interior and an opening at a back side to provide access to a back portion of an associated wall. This arrangement allows the enclosure to be installed within the associated wall of a controlled environment without having residual mechanical fittings or cracks about the front side and thereby reduces the accumulation of unwanted air particulate. However, it requires the use of additional space adjacent the back portion of the associated wall for access to mechanical fittings for securing the enclosure within the associated wall. In addition, these types of installations often require caulking or other sealing around the wall/enclosure interface, and the enclosure must be removed and reinstalled in order to re-caulk or replace the sealing.

Therefore there remains a need to provide an enclosure and a method of installing an enclosure within a controlled atmosphere to reduce the risk of uncontrollable accumulation of air particulate therein while facilitating a weatherproof seal. Additionally, there remains a need for a closure seal method and apparatus for a wall mount enclosure to allow for efficient placement and maintenance of the enclosure on an associated wall within a controlled atmosphere.

BRIEF DESCRIPTION

The present disclosure relates to an enclosure for mounting in an opening of an associated wall, the enclosure comprising a housing having a front side, a back side and at least one side wall, the side wall extending between the front side and the back side and defining an interior that is accessible from an opening in the front side. A clamping apparatus is provided to clamp the housing within the opening of the associated wall. A flange extends around all or at least a portion of the front side of the housing, and extends along a plane of the front side outwardly beyond the sidewall, the flange having a backside at least a portion of which directly engages at least a portion of an outer surface of the associated wall when the clamping apparatus clamps the housing within the opening of the associate wall. A closure door is operatively mounted to the enclosure in a closed position to prevent outside access through the opening in the front side, the closure door including a bent portion or an otherwise inwardly facing portion generally facing the associated wall around all or at least a portion of a periphery of the door. A gasket engages at least part of the inwardly facing portion of the closure door with a first portion pressed by the bent portion of the closure door when the closure door is in the closed position to form a seal between the structure wall and the inwardly facing portion of the closure door to seal the interior of the enclosure.

In another embodiment, a wall mount enclosure and sealing assembly are provided for electrical devices, where the enclosure includes a housing defining an interior that is accessible from an opening in a front side and is configured to support electronic equipment therein. A closure door is operatively mounted to the enclosure in a closed position to prevent outside access through the opening in the front side, and may be mounted for selective movement to an open position. The closure door includes an inwardly facing portion, such as a bent portion generally facing towards the front side of the housing around all or at least a portion of a periphery of the door, the inwardly facing or bent portion extending laterally outward of the periphery of the opening. A gasket engages at least part of the inwardly facing portion of the closure door with a seal portion or first portion pressed by the inwardly facing portion of the closure door when the closure door is in the closed position to form a seal between the front side of the housing and the inwardly facing portion of the closure door to seal the interior of the enclosure.

Still other features and benefits of the present disclosure will become apparent from the following detailed description.

BRIEF DESCRIPTION OF THE DRAWINGS

FIG. 3C is a side elevation view of the wall mount enclosure of FIG. 3A with the door in the open position;

FIG. 6A is a cross-sectional view of another embodiment of the wall mount enclosure mounted in an opening of an associated wall, showing the gasket with the door in the open position allowing simple installation and/or replacement of the gasket;

DETAILED DESCRIPTION

It is to be understood that the detailed figures are for purposes of illustrating exemplary embodiments only and are not intended to be limiting. Additionally, it will be appreciated that the drawings are not necessarily to scale and that portions of certain elements may be exaggerated for the purpose of clarity and ease of illustration.

In accordance with the present disclosure, an enclosure, seailing apparatus and methods for installing and sealing an enclosure are provided for the efficient installation of a human machine interface (HMI) or other enclosure within an associated wall in a location requiring a controlled atmosphere. The enclosure can be used to reduce the risk of uncontrollable accumulation of moisture and unwanted air particulate therein. Additionally, a gasket is provided on the enclosure to allow the enclosure to remain sealed and allow a user access to the interior of the enclosure without having to remove structural components of the enclosure. Additionally, the enclosure and gasket require less time to install, replace and maintain.

Figure 5A:
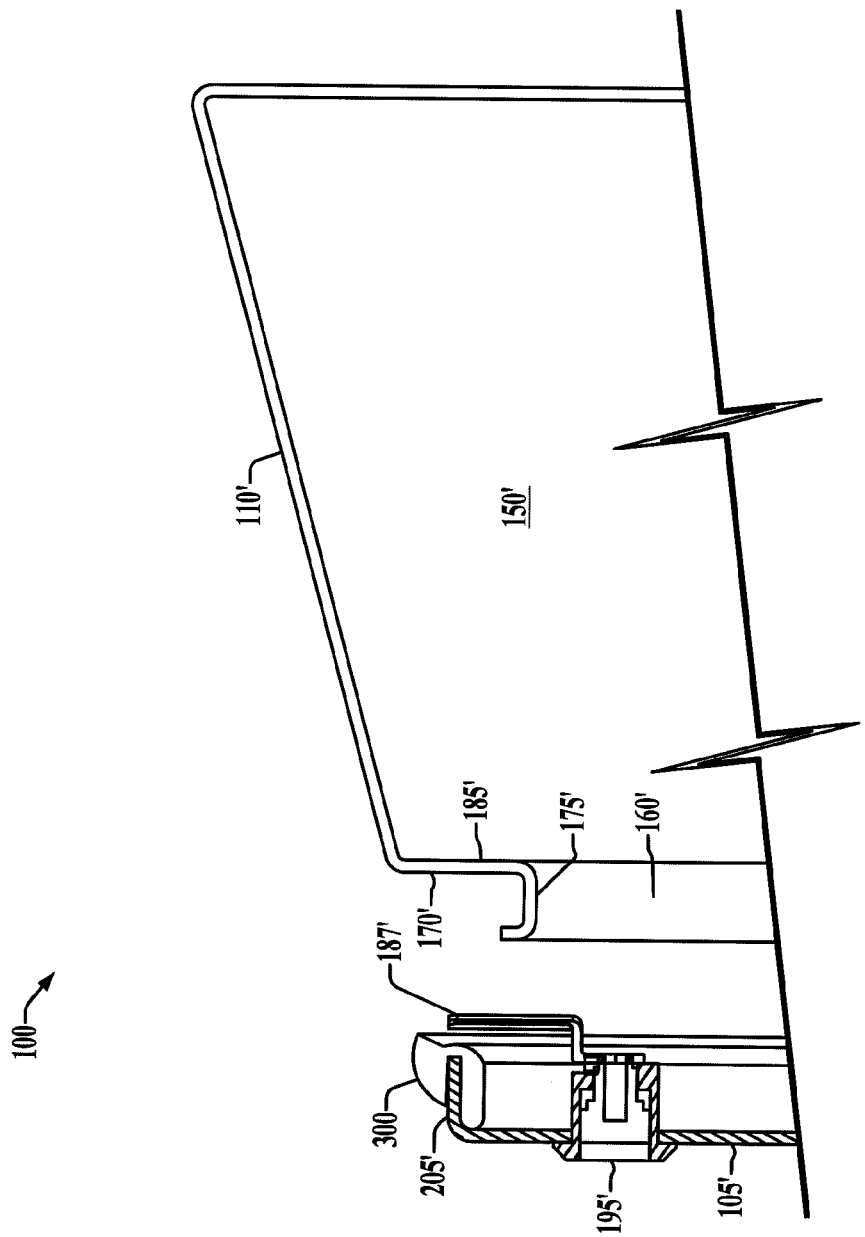
FIG. 5A is a partial cross-sectional view of one embodiment of the wall mount enclosure and the gasket with the door in the open position.
Figure 5B:
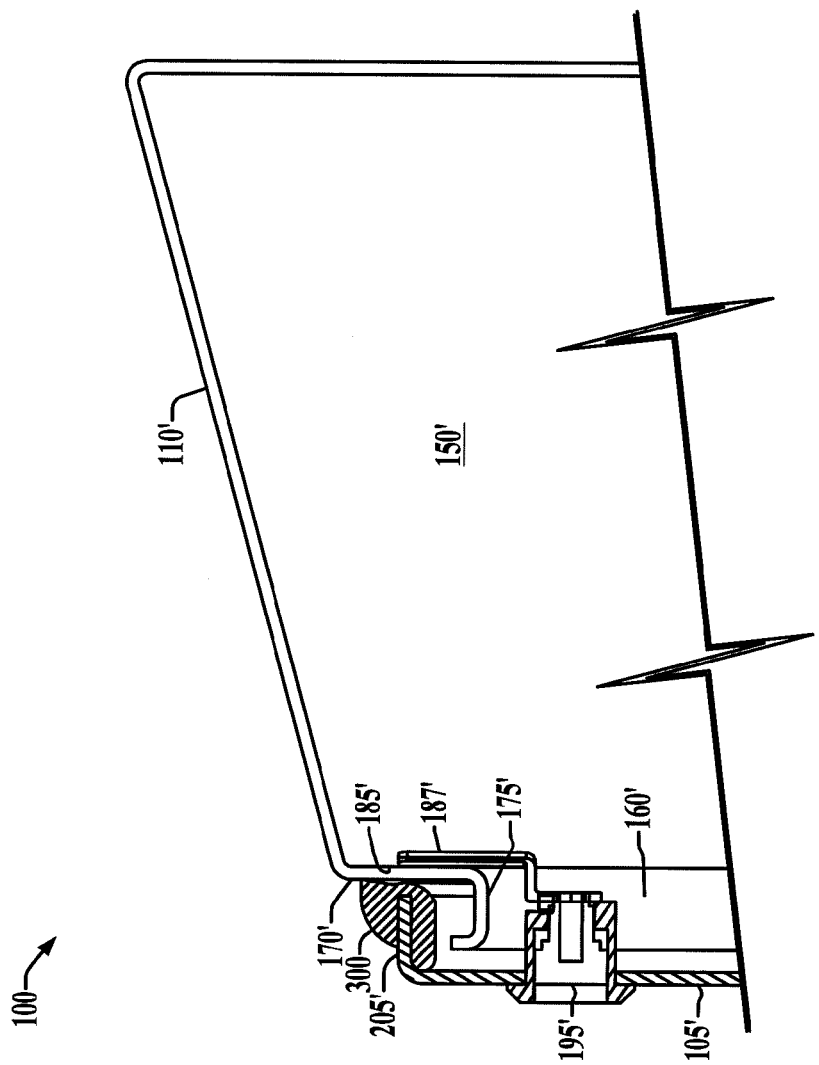
FIG. 5B is a partial cross-sectional view the wall mount enclosure and the gasket of FIG. 5A with the door in the closed position.
Figure 6B:
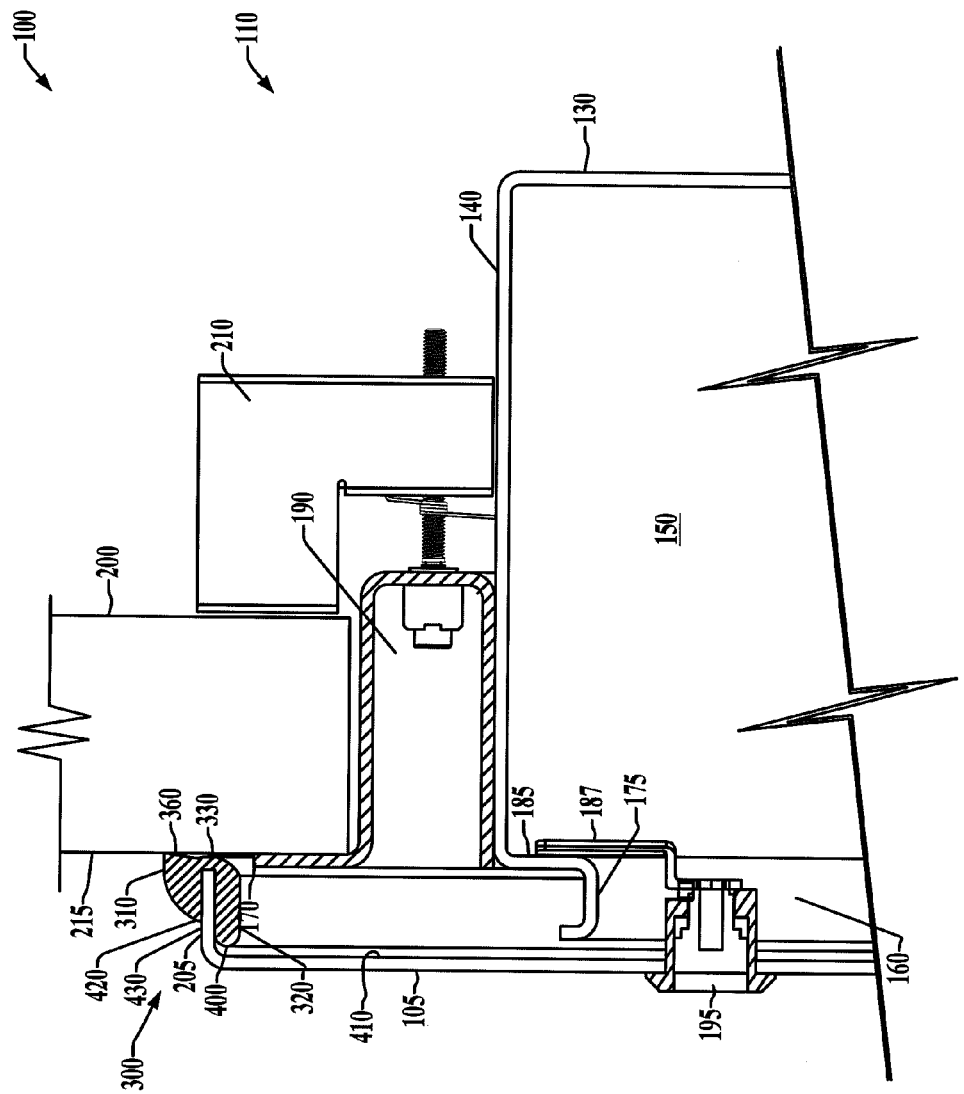
FIG. 6B is a cross-sectional view the wall mount enclosure and the gasket of FIG. 6A with the door in the closed position.
Figure 8:
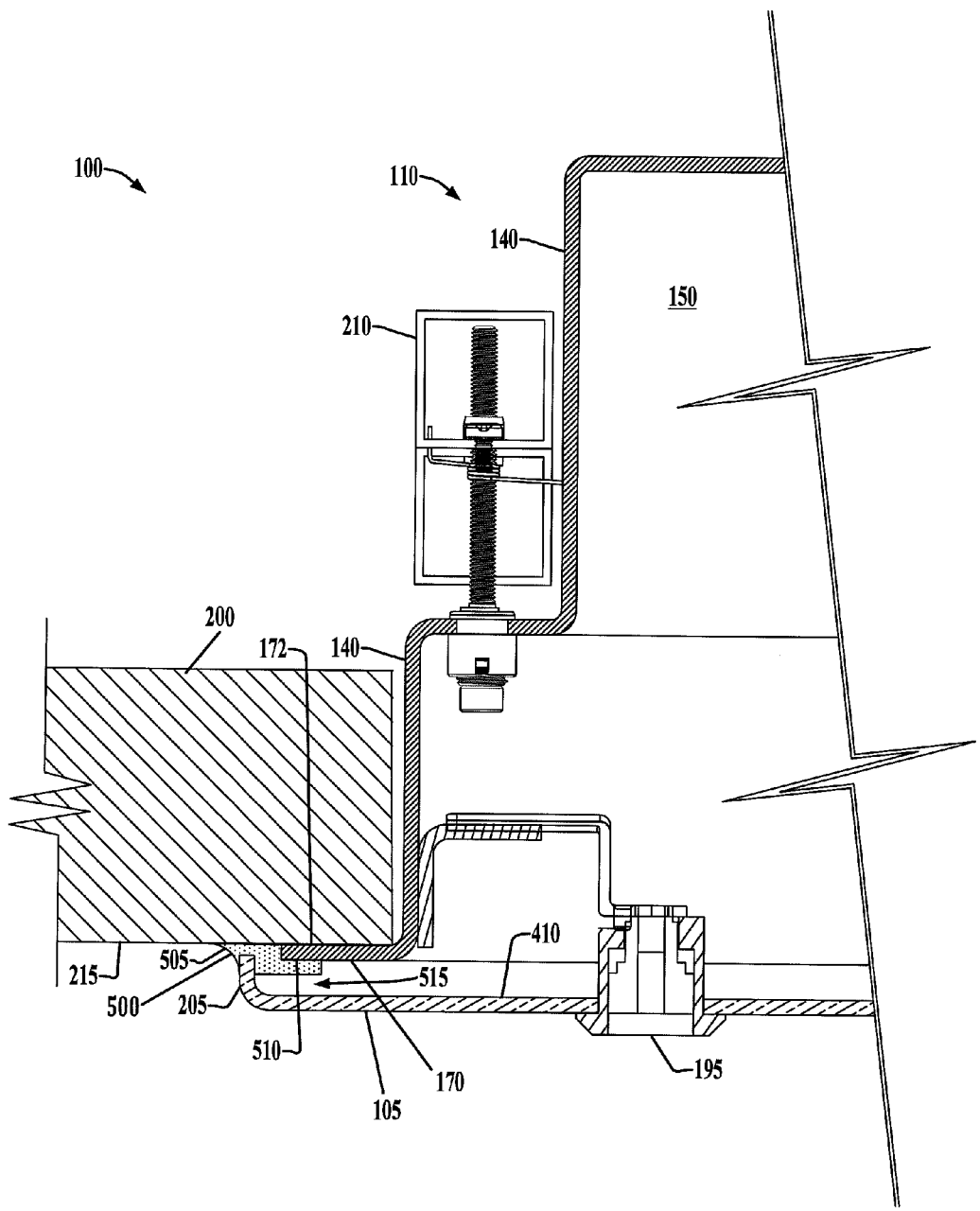
FIG. 8 is a partial cross-sectional view of a wall mount enclosure and a second embodiment of the gasket according to the present disclosure.

With reference to FIGS. 1-4, an enclosure 100 is provided for mounting in a wall opening or a cutout of an associated wall 200 (see FIGS. 6A, 6B and 8). In another embodiment, the enclosure 100' can be separately supported by a separate support structure (see FIGS. 5A and 5B) such as a pole or arm (not shown).

The enclosure 100 comprises a housing 110 having a front side 120, a back side 130 and at least one sidewall 140. The sidewall 140 extends between the front side 120 and the back side 130 and defines an interior 150 or cavity that is accessible from an opening 160 in the front side 120. In certain embodiments, the sidewall 140 may have a terraced or stepped profile. In certain embodiments, moreover, the housing 110 may have a rectangular shape with four sidewalls 140 as illustrated. The front side 120 has a flange or outer perimeter 170 (e.g., FIGS. 3A-3C, 6A and 6B) with at least a portion of the flange 170 extending outwardly to interface with a front surface 215 of the wall 200 when the housing 110 is installed in the wall opening 200 (e.g., FIGS. 6A and 6B). The flange 170 in certain embodiments extends around all or at least a portion of the front side 120 of the housing 110, and extends along a plane of the front side 120 outwardly beyond the sidewall(s) 140. As best seen in FIGS. 6A and 6B, moreover, the flange 170 includes a backside, at least a portion of which directly engages at least a portion of the front surface 215 of the wall 200 when a connector assembly clamps the housing within the opening of the wall 200.

In one embodiment, the wall mount enclosure 100 is provided with four side walls 140 positioned between the front side 120 and back side 130 defining the interior 150, where the enclosure 100 has a generally rectangular shape. However, the enclosure may comprise any shape as may be needed by the particular application or design.

The wall mount enclosure 100 is provided with a closure door 105 having a display 115 or monitor and an input device 125 or keypad accessible from the front side 120 by an associated user. The display 115 and input device 125 may also be combined into a touch-screen type apparatus. However, the wall mount enclosure 100 may contain other devices or items that may be beneficial for use or storage in a controlled atmosphere.

Optionally, at least one electrical port 180 (FIG. 1B) extends from the enclosure 100 for operable connection of components within the enclosure to an associated power supply (not shown) and/or for communications connections. In one embodiment the electrical port 180 extends from back side 130 to allow the electronic devices housed within the interior 150 to connect to the associated power supply or an associated data/server line.

The opening 160 is provided at the front side 120 for access to the interior 150. The closure door 105 is provided for operative covering of the opening 160 and is configured to be placed in an open position and a closed to prevent unwanted access by associated users and/or foreign particulate. The closure door 105 includes a an inwardly facing portion 205, in one example provided by a bent portion 205 that extends from a periphery of the closure door 105 and generally faces the wall 200 around all or at least a portion of the perimeter of the door 105. The inwardly facing portion 205 can be formed from the door material, for example, by bending the peripheral sides, top and bottom of the illustrated rectangular door structure 105, or other inwardly facing structures can be provided as part of the closure door 105, for example, metal structures welded to the peripheral portions of a backside of the door 105 which generally face the wall 200 around all or at least a portion of the perimeter of the door 105.

Figure 1B:
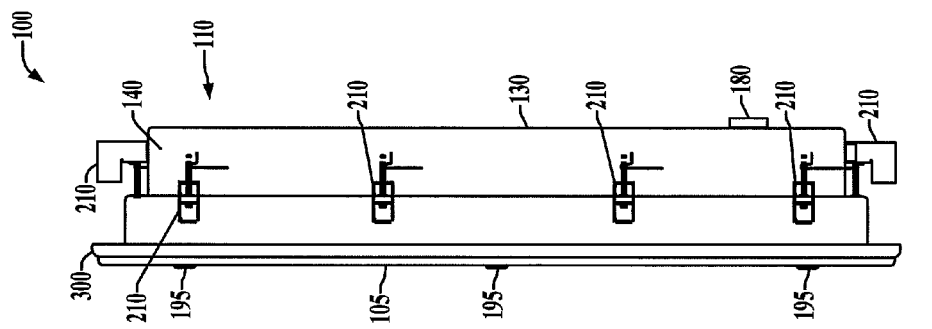
FIG. 1B is a side elevation view of the wall mount enclosure of FIG. 1A.
Figure 1A:
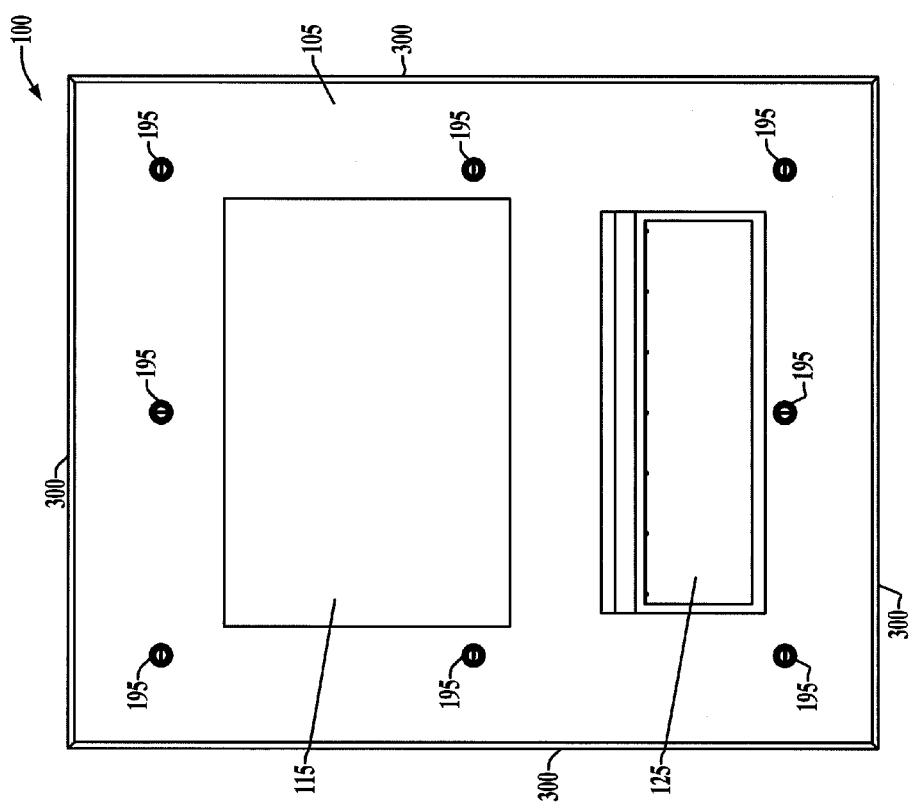
FIG. 1A is a front elevation view of a wall mount enclosure with a closure door in a closed position.
Figure 2B:
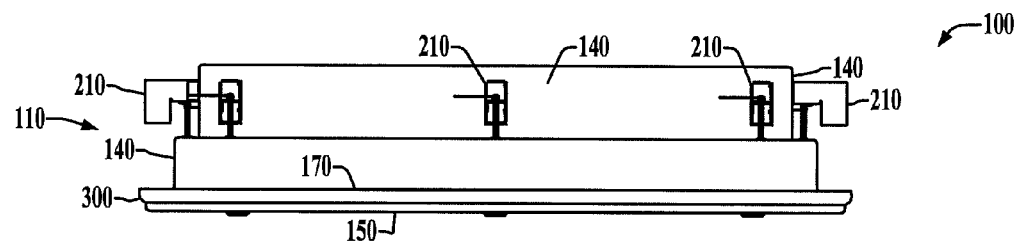
FIG. 2B is a top plan view of the wall mount enclosure of FIG. 1A.
Figure 2A:
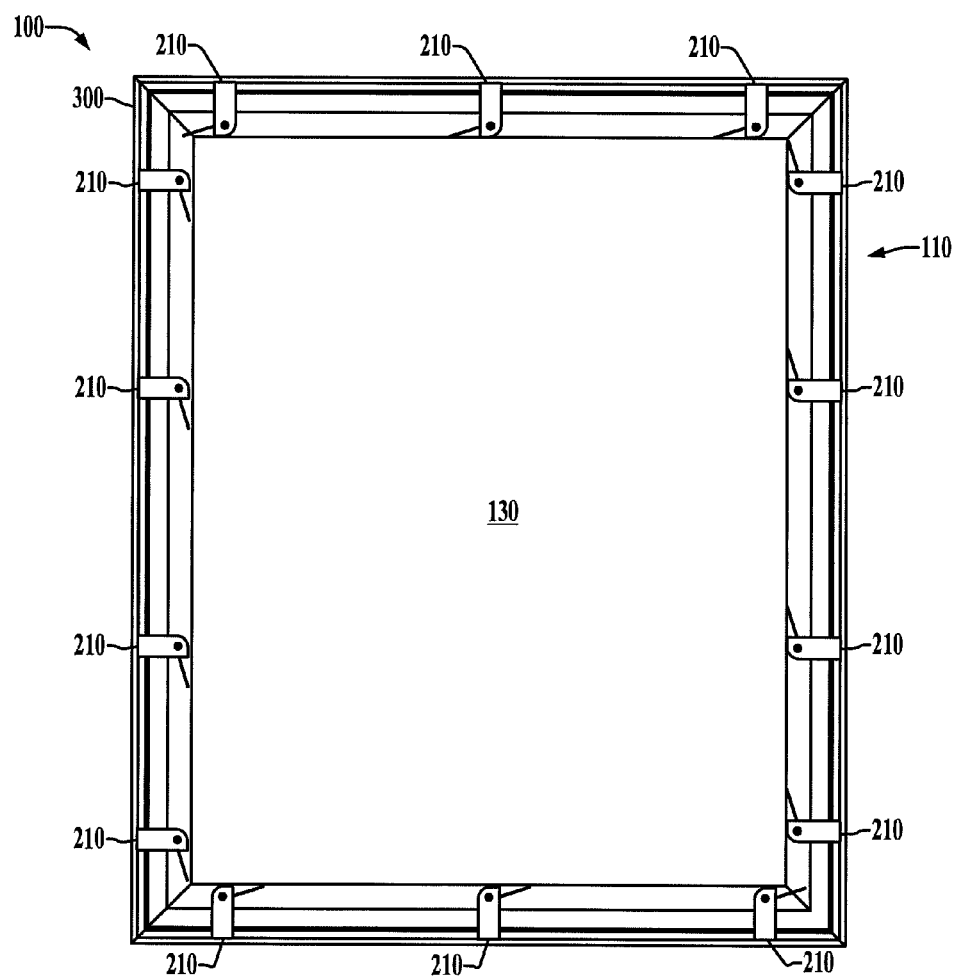
FIG. 2A is a rear elevation view of the wall mount enclosure of FIG. 1A.
Figure 3A:
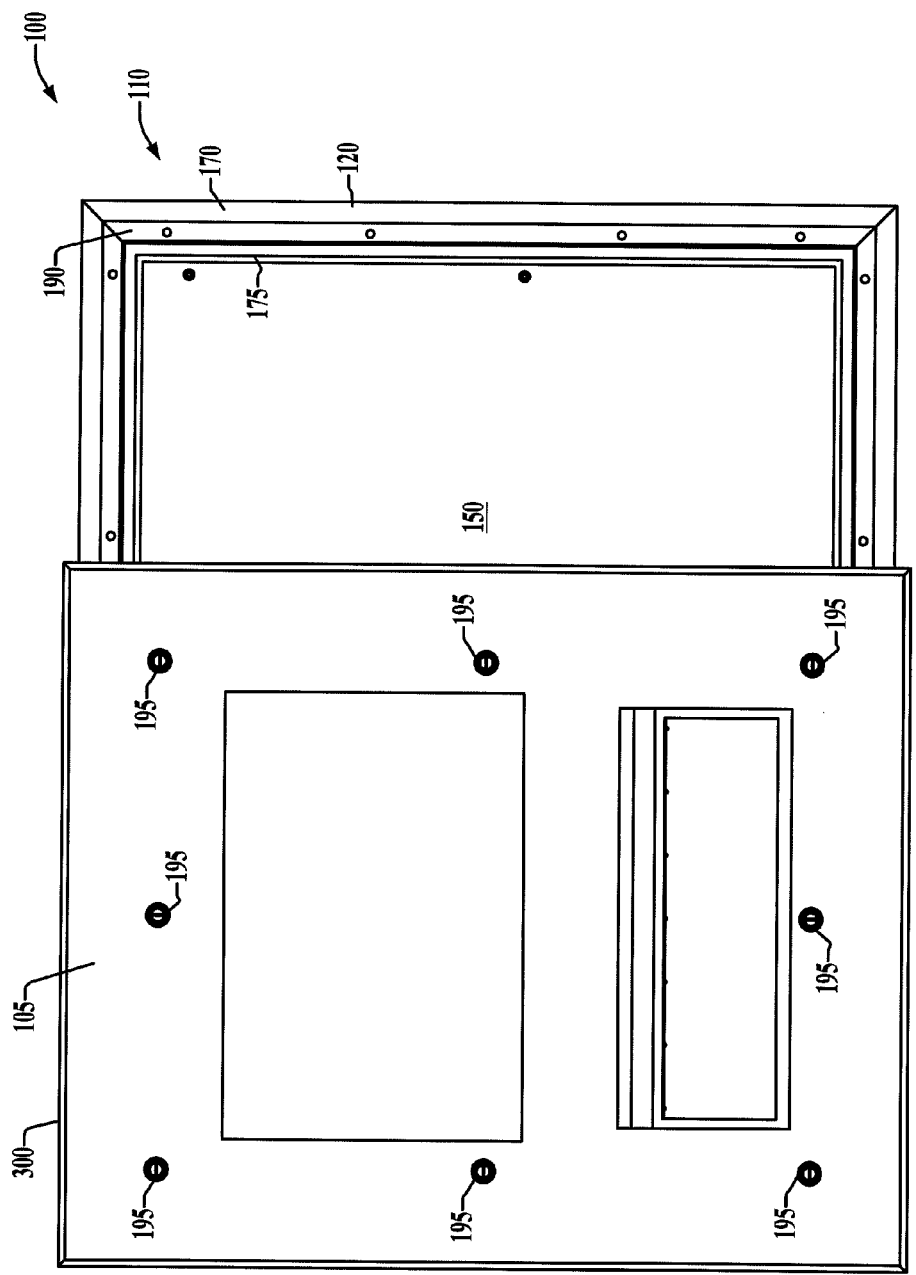
FIG. 3A is a front elevation view of the wall mount enclosure with the closure door in an open position.
Figure 3B:
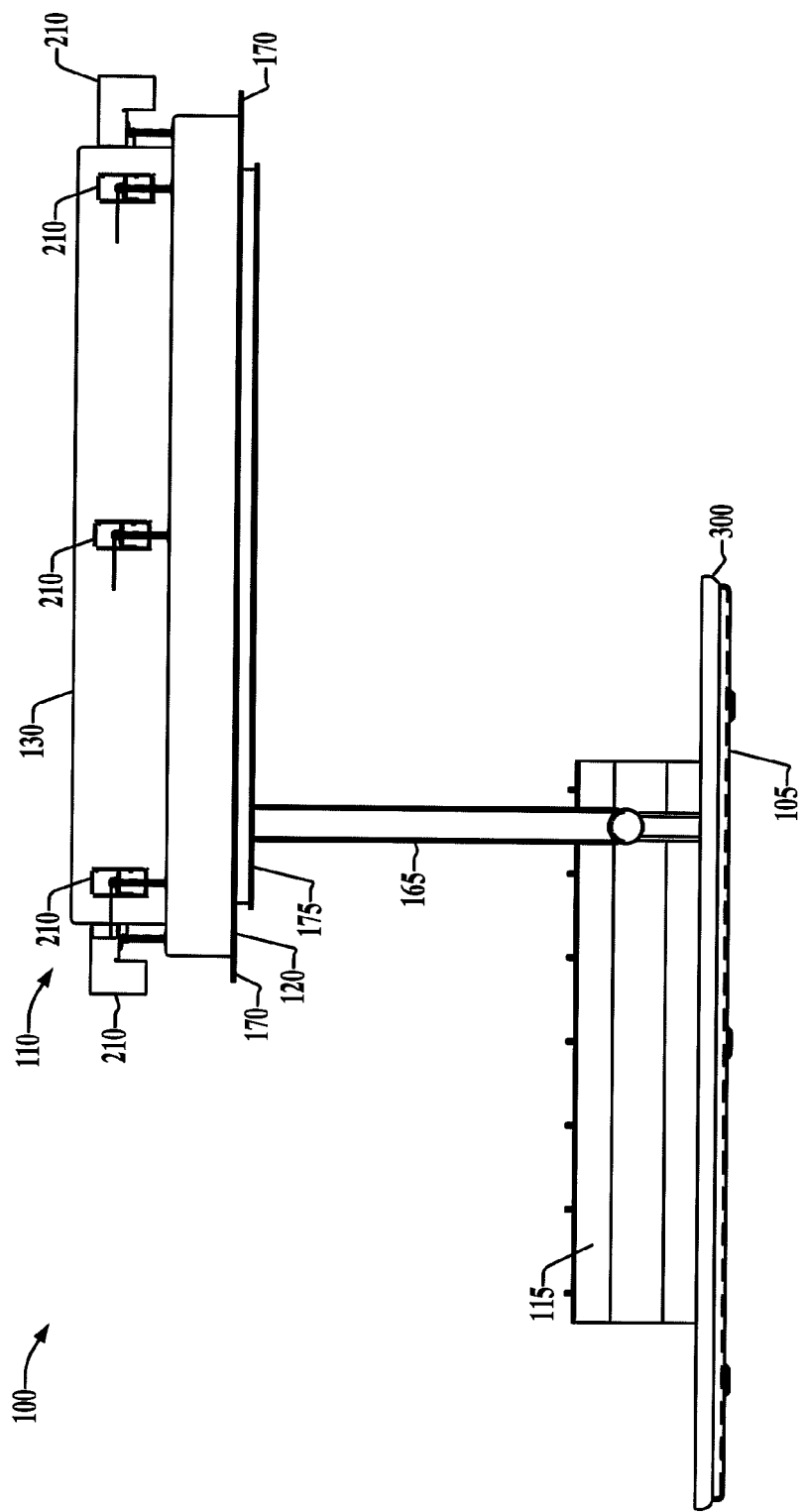
FIG. 3B is a top plan view of the wall mount enclosure of FIG. 3A in the open position.
Figure 4:
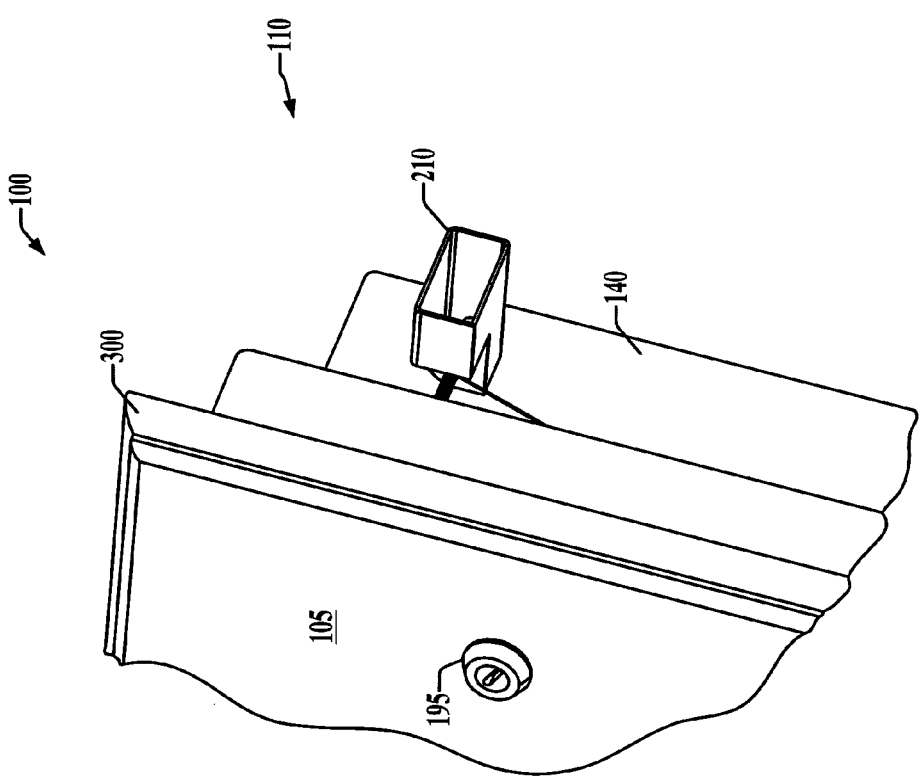
FIG. 4 is an enlarged perspective view of a portion of the wall mount enclosure, a gasket and a clamping mechanism according to one embodiment of the present disclosure.

As illustrated by FIGS. 3A-3C, the closure door 105 can be attached to a structural arm 165 that is also attached to the interior 150 of the housing 110. The structural arm 165 can be extendable and detachable from both the closure door 105 and the housing 110 to allow the closure door 105 and arm 165 to be replaced. Additionally, the structural arm 165 can rotate relative to the housing 110 and rotate relative to the closure door 105 allowing for an increased range of motion of the closure door 105 in the open position. This embodiment allows a user to maintain the electronic equipment within the housing 110 without having to completely remove the closure door 105. Additionally, when in the closed position, the closure door 105 can be sealingly engaged to over the opening 160 and without the use of conventional hinges. Other hinged or non-hinged arrangements are possible for supporting the door 105 relative to the housing 110 when in the open position (e.g., hinged or pivotal arrangements, sliding hinges, etc.), and embodiments are possible in which the closure door 105 is removable from the housing 110.

In one embodiment, the closure door 105 is attached to the enclosure by a plurality of latches 195 that can be opened by a proprietary key or by rudimentary latching means known in the art. In one embodiment, a quarter turn latch 195 is provided where an arm 187 is operatively rotated in abutting position with an internal flange 185. The internal flange 185 extends from the interior 150 of the housing. A variety of different latching apparatus may be used in various embodiments, it should be noted that any type of latch may be acceptable for attaching the closure door 105 to the front side 120, preferably locking the closure door 105 and concealing the opening 160 to prevent or inhibit unwanted access by associated users and/or foreign particulate materials.

In one embodiment, as shown in FIGS. 1B, 2A, 2B, 3B, 3C, 4, 6A and 6B, the assembly includes a plurality of clamp mechanisms 210 that are mounted to the enclosure 100 and are operative to mount the enclosure 100 to the wall 200. In one embodiment, U.S. Pat. No. 8,528,264 to Thut et al., the entirety of which is hereby incorporated by reference, discloses one suitable embodiment of clamp mechanisms which may be used, and which advantageously allow the housing 110 to be installed within an opening of the associated wall 200 and to facilitate clamping the housing 110 to the associated wall 200 entirely through operation of the clamping mechanisms 210 from within the interior of the housing 110, thereby allowing installation without access to the rear side of the associated wall 200.

In the embodiment illustrated by FIGS. 5A and 5B, like features are identified by like numerals with a prime (') suffix and new features are identified by new numerals. FIGS. 5A and 5B illustrate an enclosure 100' in which a housing 110' is configured to have a stand-alone configuration capable of being installed within a controlled atmosphere by attaching to a structural member such as an overhead arm, tripod, structural pole, a wall, or other support arrangement (not shown). The enclosure 100' is illustrated in an open position (FIG. 5A) and a closed position (FIG. 5B). The housing 110' includes an inner flange 175' that defines a channel about an opening 160'. A closure door 105' with bent portion 205' is configured to sealingly engage a front side 120' of the housing 110'. The inner flange 175' extends from the front side 120' of the housing 110' and defines an opening 160'. In the closed position, the inner flange 175' can extend to abut an inner surface of the closure door 105' or can abut against a gasket (not shown) along the inner surface of the closure door 105' in other embodiments. Further embodiments are possible, for example, in which there is a gap between the inner flange 175' and the inner surface of the closure door 105' when the door is in the closed position as shown in FIG. 5B. The inner flange 175' in certain embodiments advantageously facilitates provision of a NEMA 4× rating as it prevents water or fluid from entering within the interior 150' of the housing 110'. A gasket 300 is configured to sealingly engage the closure door 105' against the front side 120' of the housing 110' in the closed position. The gasket 300 will be discussed in further detail below, and advantageously facilitates provision of an aseptic seal in certain embodiments.

Similarly, as illustrated by FIGS. 6A and 6B, the exemplary enclosure 100 is illustrated in an installed position within an opening of the associated wall 200 in an open position (FIG. 6A) and a closed position (FIG. 6B). As seen in these figures, the housing 110 includes an inner flange 175 that defines a channel about the opening 160. The closure door 105 in this example has an inwardly facing bent portion 205 configured to sealingly engage a front side 120 of the housing 110 with a gasket 300. The inner flange 175 in this example extends from the front side 120 of the housing 110 and defines the opening 160. In the closed position, the inner flange 175 can extend to abut an inner surface of the closure door 105 or can abut against a gasket (not shown) along the inner surface of the closure door 105, or a gap may be provided therebetween as shown. The inner flange 175 in this example assists to provide a NEMA 4× rating by preventing or inhibiting entrance of water or fluid into the interior 150 of the housing 110. The gasket 300 is configured to sealingly engage the closure door 105 against the wall 200. As illustrated by FIG. 6B, the closure door 105 extends outwardly beyond the periphery of the flange 170 such that the inwardly extending (e.g., bent) portion 205 extends laterally outward of the periphery of the flange 170. As such, the gasket 300 does not engage the flange 170 in this embodiment, but is sealingly abutted against an exposed portion of the wall 200. Additionally, as illustrated by FIGS. 6A and 6B, the enclosure 100 is provided with a perimeter channel 190 that is adapted to support the plurality of clamp mechanisms 210 while maintaining separation between the clamp mechanisms 210 and the interior 150 of the housing 110. In this case, moreover, the side wall 140 does not include a stepped or terraced structure. The perimeter channel 190 extends about the periphery of the enclosure 100 and assists to prevent air particulates or fluid from entering the interior 150 through the back portion of the wall 200. It is noted in this regard that the gasket 300 advantageously does not extend between the backside of the flange 170 and the associated wall 200, thereby facilitating easy removal and replacement of the gasket 300, for example, by simply opening the door 105, removing the old gasket 300, and installing another gasket on the inwardly extending portion 205 of the door 105, before again closing the door 105.

Figure 7:
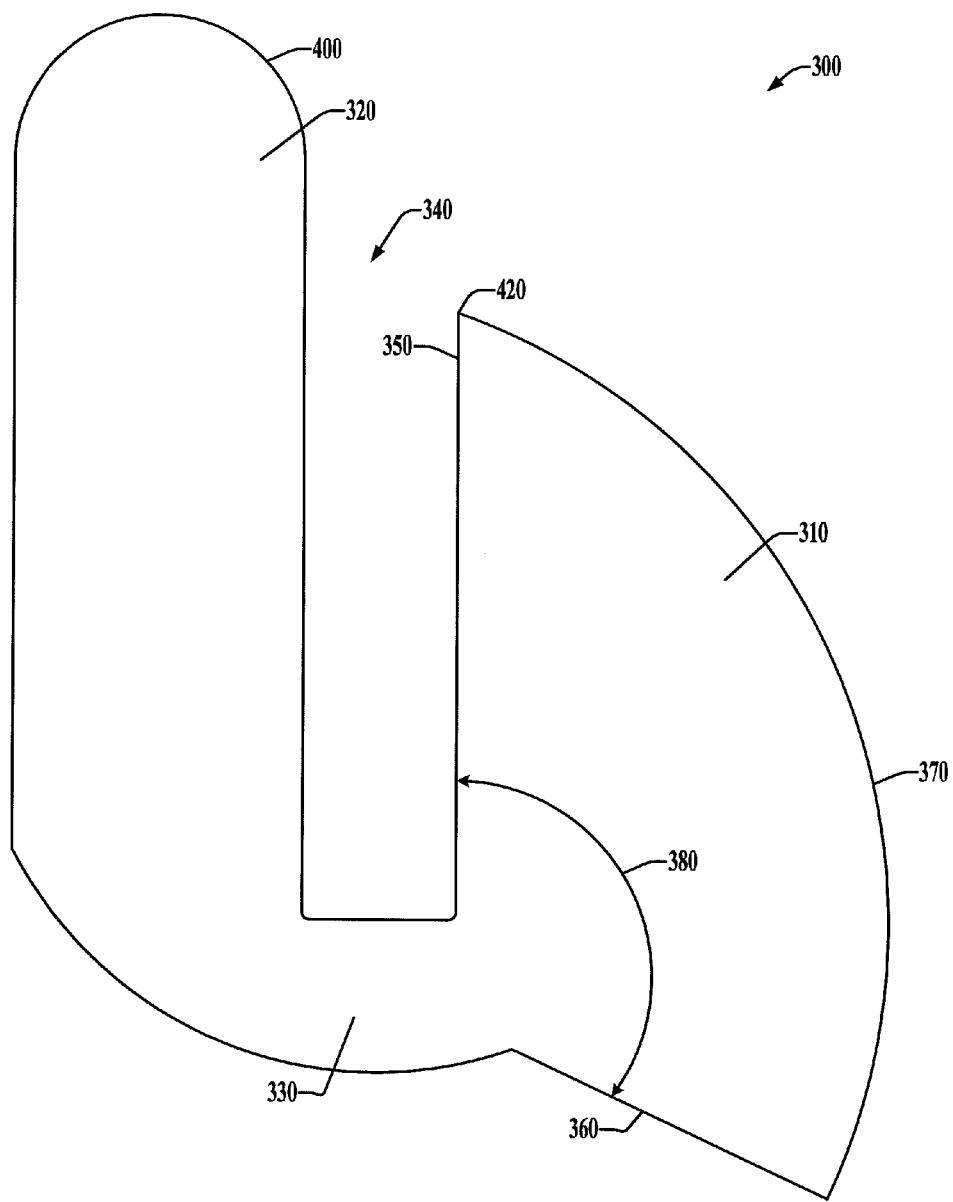
FIG. 7 is a cross sectional view of one embodiment of the gasket according to the present disclosure.

As illustrated by FIG. 7, a cross sectional view of the gasket 300 is provided, where the gasket 300 is configured to be placed along the bent portion 205 of the closure door 105 to sealingly engage the closure door 105 to cover the opening 160 of the enclosure 100. In one embodiment, the gasket 300 has an elongated body having a cross sectional profile shape that includes a seal portion or first portion 310 which is exposed to the external environment of the enclosure 100 when installed and the door 105 is in the closed position, as well as a second portion 320. The seal portion 310 can have a generally bulbous configuration adapted to extend along the exterior portion of the door 105, with a convex profile as shown, where the convex profile in certain embodiments advantageously extends to the point which engages the outer surface of the associated wall 200 into which the enclosure 100 is installed. The first portion 310 in this example is connected to the second portion 320 by a hinge portion 330. The second portion 320 can have a generally elongate configuration adapted to extend along the interior portion of the door 105. The first portion 310, the hinge portion 330 and the second portion 320 define a channel 340 configured to engage at least part of the inwardly extending (e.g., bent) portion 205 of the closure door 105, for example, as seen in FIGS. 6A and 6B. In one embodiment, the closure door 105 has a perimeter that has a general rectangular shape in which the gasket 300 is placed continuously about each side of the perimeter of the closure door 105.

The first portion 310 of the gasket 300 includes a first surface 350 and an opposite second surface 360. An outer surface 370 extends between the first surface 350 and the second surface 360. In one embodiment, the first surface 350 and the second surface 360 define an angle 380 when the door 105 is in the open position that is between 90 degrees and 130 degrees. More preferably, the first surface 350 and the second surface 360 define an open position angle 380 that is over 90 degrees and more specifically about 115 degrees. As illustrated by FIGS. 5A, 5B, 6A, 6B and 7, the outer surface 370 of the bulbous portion 310 of the gasket 300 has a generally convex shape. In this embodiment, the first portion 310 sealing engages the wall 200 (FIG. 6B) or the front side 120' (FIG. 5B) such that the first surface 350 of the first portion 310 is pressed against the bent portions 205, 205' of the doors 105, 105' and the second surface 360 of the first portion 310 is pressed against the wall 200 or front side 120' of the housing 110', respectively. This convex configuration of the first portion 310 is configured to allow the gasket 300 to sufficiently engage the door 105 and the wall 200 or the front side 120' of the housing 110' in the closed position. Thus the gasket 300 is compressed against each of the sides providing a seal to cover the opening 160. In this embodiment, the hinge portion 330 comes close to but need not abut against the wall 200 or the front side 120', although abutment is possible in certain embodiments.

Additionally, the second portion 320 of the gasket 300 has a length that extends from the hinge portion 330 to a first position 400 along an inner surface of the bent portion 205 of the closure door 105. The first portion 310 of the gasket 300 has a length that extends from the hinge portion 330 to a second position 420 along an outer surface 430 of the door 105. The first position 400 is further from the hinge portion 330 than the second position 420. This configuration allows the gasket 300 to make a snug friction fit about the surface of the bent portion 205 of the closure door 105. Additionally, this configuration allows the first portion 310 of the gasket 300 to sufficiently press against the bent portion 205 and against the wall 200 or front side 120' while maintaining its position on the bent portion 205 of the closure door 105. The second elongated portion 320 may also extend from the hinge portion 330 to abut against an inner surface 410 of the closure door 105.

The gasket 300 in certain embodiments comprises an elastomeric material that is capable of providing a sealed arrangement between the door, wall opening and the controlled environment. The gasket 300 may be made of a silicone material having a durometer measurement of about 30. However, other durometer measurements and materials could be used. Preferably, the gasket material is approved by the Food and Drug Administration (FDA) for use in controlled atmospheres whereby unwanted moisture and air particulate is prevented from collecting in cracks or spaces between the door 105 and the wall 200 or front side 120'.

FIGS. 8-20 illustrate various other embodiments of a gasket for an enclosure as provided herein. FIG. 8 is a cross-sectional view of the wall mount enclosure and a second embodiment of the gasket according to the present disclosure. The flange 170 directly engages the wall 200 when the enclosure 100 is mounted in the structure wall opening, wherein a gasket 500 does not extend between the front or outer side of the structure wall 200 and a back side of the flange 170. In this manner, a single seal is provided when the enclosure 100 is clamped to the structure wall 200 and the door 105 is in the closed position between a bent portion 205 of the closure door 105 and the structure wall 200. This configuration allows the gasket 500 to be easily replaced without unclamping the enclosure from the structure wall, thereby facilitating field replacement and providing significant advantages not possible with the gasket shown in U.S. Pat. No. 8,528,264 to Thut et al.

In addition, the bent portion 205 extends laterally outward of the periphery of the flange 170 as shown, such that when the door 105 is closed, the gasket 500 engages at least part of the bent portion 205 of the closure door 105 with a seal portion 505 pressed toward the front surface 215 of the structure wall 200 by the bent portion 205 to form a seal between the structure wall 200 and the bent portion 205 of the closure door 105 to seal the interior 150 of the enclosure 100.

It is noted that although the figures illustrate sectional views of the enclosure 100 and gasket embodiment including portions of the housing flange 170, structure wall 200, door 105 and gasket 300, 300', 500, similar structure is provided in certain embodiments around the entire periphery, for example, along the top, bottom, and laterally left and right sides of a rectangular opening in the structure wall in a rectangular housing embodiment. Moreover, while illustrated in the context of a rectangular enclosure, other shapes e.g., circular, triangular, octagonal, hexagonal, or composite shapes (with multiple curved and/or straight portions) can be provided having at least one sidewall 140 and associated flange 170, with the door 105 having a bent portion 205 extending laterally outward of the flange 170 and at least partially facing the front surface 215 of the structure wall 200, along with a gasket as shown in the sectional views or variants thereof.

In the embodiment of FIG. 8, the gasket 500 extends laterally along a portion of the front surface 215 of the structure wall 200, and may, but need not, engage a lateral edge 510 of the flange 170. As noted above, the gasket does not extend between the front surface 215 of the structure wall 200 and a backside 172 of the flange 170. As provided in FIG. 8, a gap 520 is provided between the gasket 500 and the inner surface 410 of the closure door 105. In this example, moreover, gaskets 500, and 500' (FIGS. 9 and 20) include a portion that overlies part of the lateral edge 510 of the flange 170. In this regard, as further shown in FIGS. 10-12, the gasket need not engage the flange 170 at all in certain embodiments.

Figure 9:
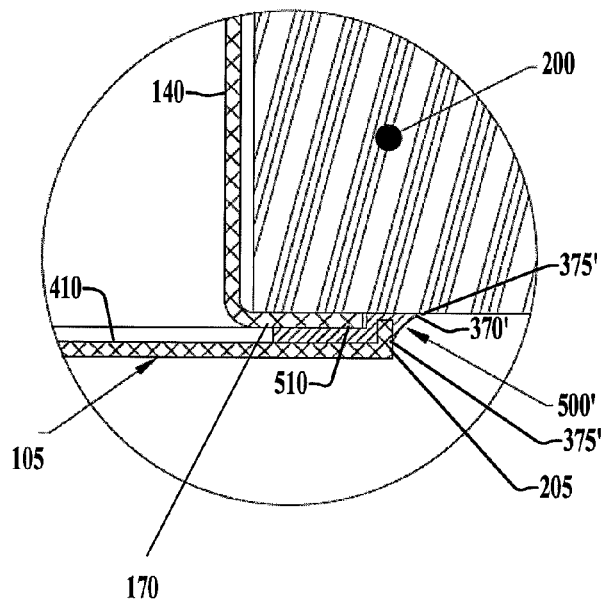
FIG. 9 is an enlarged partial cross-sectional view of the wall mount enclosure and a third embodiment of the gasket according to the present disclosure.
Figure 20:
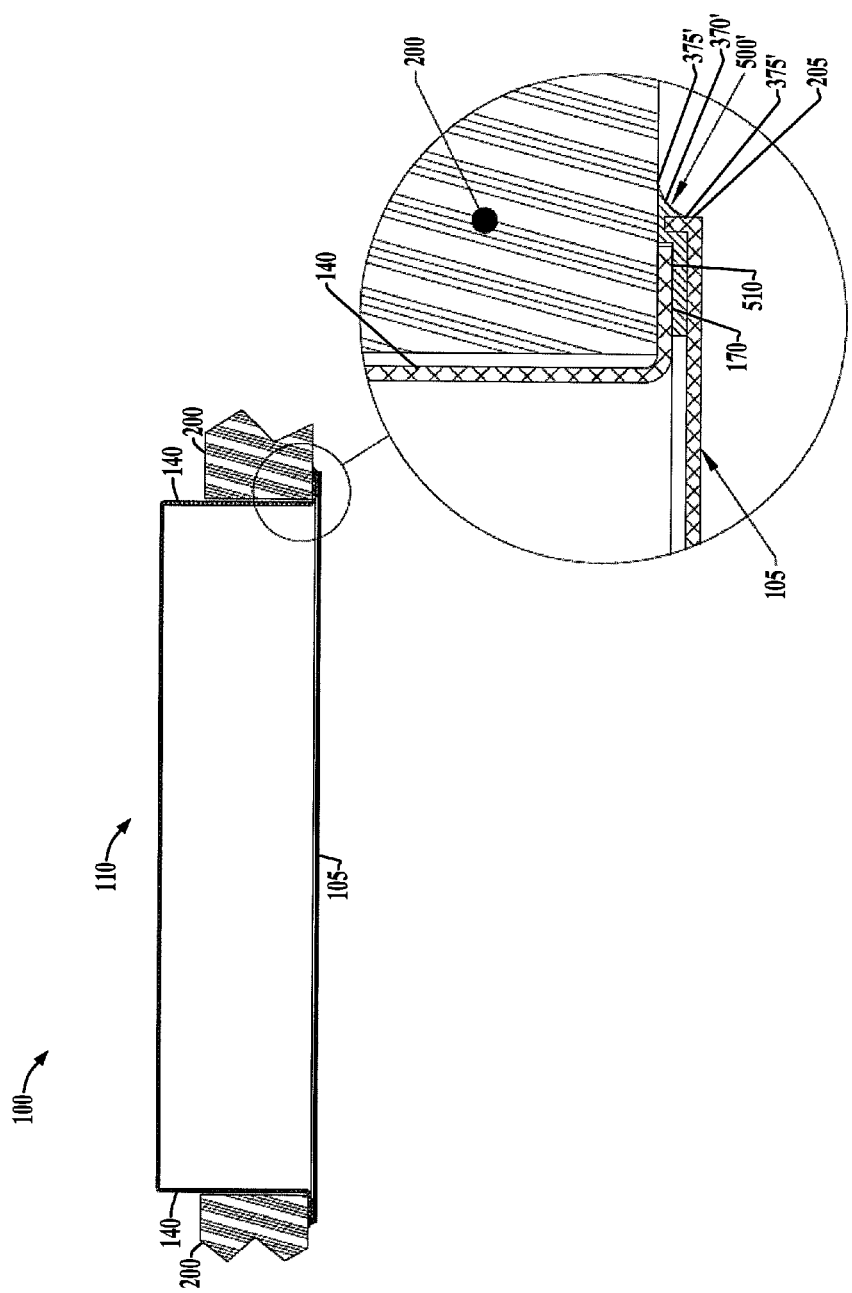
FIG. 20 is a cross-sectional view of a portion of the wall mount enclosure and a fourteenth embodiment of the gasket according to the present disclosure.

In this regard, the example of FIGS. 9 and 20 provides a gasket 500' which engages at least a portion of inner surface 410 of the door 105 inward from the bent portion 205, and also engages a portion of the lateral edge 510 of the flange 170 as shown, although not a strict requirement of all embodiments of the present disclosure. In addition, the gasket 500' in FIG. 9 includes a rounded or radial outer surface 370' or portion with tapered ends 375' engaging an outer peripheral side of the bent portion 205 of the door 105 and the front surface 215 of the structure wall 200, which advantageously mitigates accumulation of dust or other particles in certain implementations.

Figure 10:
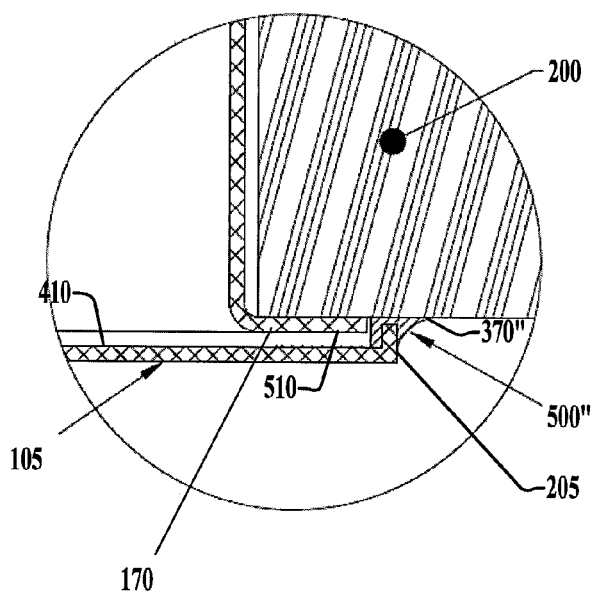
FIG. 10 is an enlarged partial cross-sectional view of the wall mount enclosure and a fourth embodiment of the gasket according to the present disclosure.

FIG. 10 illustrates a sectional view showing another possible gasket structure in accordance with the present disclosure, in which the gasket 500" again includes an arcuate outer surface 370" between a portion of the peripheral outer side of the bent portion 205 of the door 105 and the front surface 215 of the structure wall 200, but does not extend inwardly within the periphery of the flange 170, and indeed does not engage the flange 170 at all. It is noted that the embodiments of FIGS. 8-10 each provide a gasket engaging three different sides of the bent portion 205 of the door 105, including peripherally opposite inner and outer sides of the bent portion 205, as well as an inner surface 410 of the bent portion which faces the structure wall. This advantageously facilitates mounting the gasket to the door without requiring any glue or adhesive, which is particularly advantageous when using silicone gasket material.

In other implementations, the gasket need not engage the backside of the bent portion 205 of the door 105, but may nevertheless extend between the backside of the bent portion 205 and a corresponding portion of the front surface 215 of the structure wall 200 to form a seal. In this regard, the example of FIG. 10 forms a seal by the bent portion 205 of the door 105 pressing the hinge portion of the gasket toward the front surface 215 of the structure wall 200, with the door closure mechanism 195 providing sufficient force to form a seal by at least partial compression of at least this portion of the gasket. Other implementations are possible in which the gasket includes one or more surface textural shapes, such as ribs, points, recesses, etc. along one or both of the portion of the gasket which faces the structure wall and/or portions which face and engage a portion of the bent portion 205 of the door 105.

Figure 11:
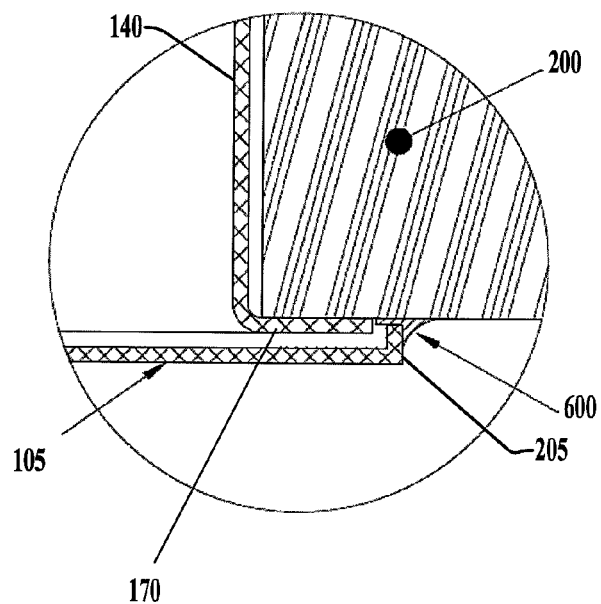
FIG. 11 is an enlarged partial cross-sectional view of the wall mount enclosure and a fifth embodiment of the gasket according to the present disclosure.

FIG. 11 shows yet another embodiment of a gasket 600 of the present disclosure, in which the gasket again does not engage the flange 170 (although variations of this embodiment are possible in which it does engage the flange 170), and the gasket engages only an edge of the bent portion 205 of the door 105 and a portion of the peripheral outer side of the bent portion 205 of the door (without engaging the inner peripheral side of the bent portion of the door). In this embodiment, moreover, the gasket 600 extends laterally inward toward the flange 170 (e.g., without actually engaging at in this example) beyond the bent portion 205 of the door 105.

Figure 12:
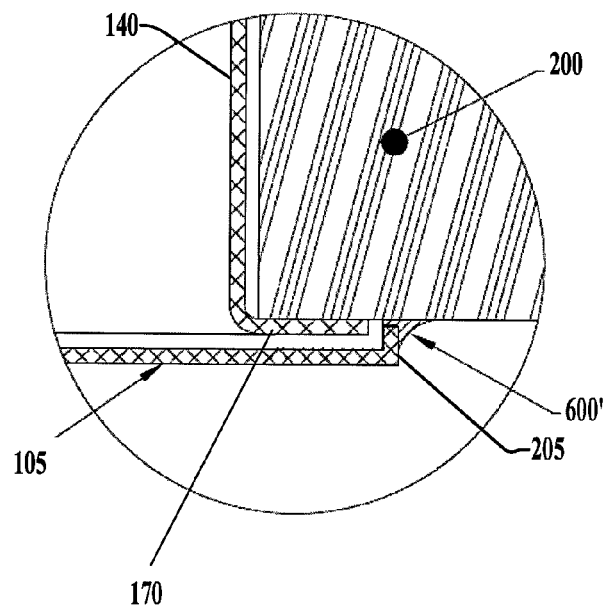
FIG. 12 is an enlarged partial cross-sectional view of the wall mount enclosure and a sixth embodiment of the gasket according to the present disclosure.

FIG. 12 shows yet another embodiment in which the gasket 600' engages only the edge and the peripheral outer side of the bent portion 205 of the door 105. In this case, in contrast to that of FIG. 11, the gasket 600' does not extend laterally inward past the bent portion 205 of the door. It is noted, in this regard, that the bent portion of the door is shown in various figures as being a sharp bend, but rounded bends are possible, such as that shown in FIG. 8.

Figure 13:
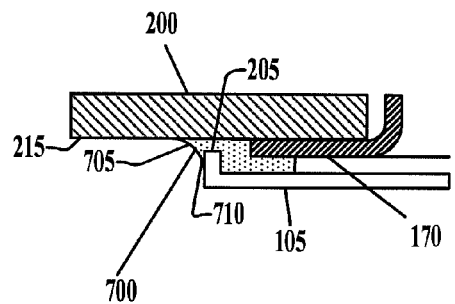
FIG. 13 is a cross-sectional view of a portion of the wall mount enclosure and a seventh embodiment of the gasket according to the present disclosure.
Figure 14:
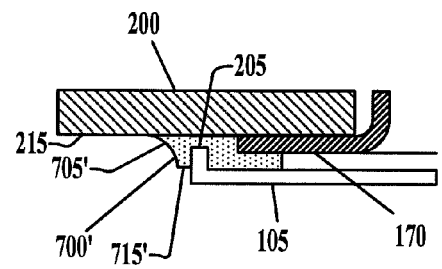
FIG. 14 is a cross-sectional view of a portion of the wall mount enclosure and a eighth embodiment of the gasket according to the present disclosure.
Figure 15:
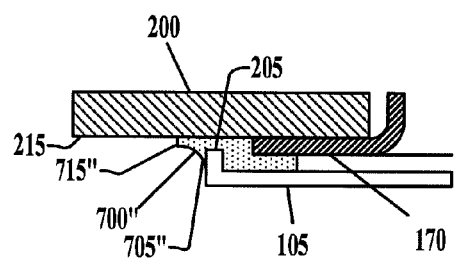
FIG. 15 is a cross-sectional view of a portion of the wall mount enclosure and a ninth embodiment of the gasket according to the present disclosure.

Referring also to FIGS. 13-19, the outer surface and shape of the gasket can be of a variety of forms. As shown in FIG. 13, for example, the gasket 700 can have a radiused or otherwise curved surface 705, where concave surfaces preferably facilitate avoidance of dust or particle accumulation, although convex or complex curvilinear forms are possible within the scope of the present disclosure. Moreover, as seen in FIG. 13, the tapered edges 710 of the curved outer surface may extend along only a portion of the outer peripheral side of the bent portion 205 of the door 105, although such may extend in other implementations along the entirety of the peripheral outer side of the bent portion 205 of the door 105. FIG. 14 shows another implementation of a gasket 700' with a curved outer surface 705' having a stepped portion 715' extending to the peripheral outer side of the bent portion 205 of the door 105, with the curved portion 705' extending all the way or substantially all the way to the front surface 215 of the structure wall 200. Another variant implementation of a gasket 700" is shown in FIG. 15 in which a curved surface 705" extends all the way or substantially all the way to the outer peripheral side of the bent portion 205 of the door 105, with a stepped portion 715" engaging the front surface 215 of the structure wall 200.

Figure 16:
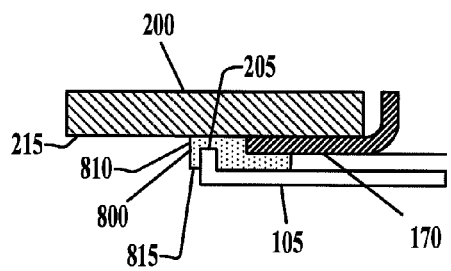
FIG. 16 is a cross-sectional view of a portion of the wall mount enclosure and a tenth embodiment of the gasket according to the present disclosure.
Figure 17:
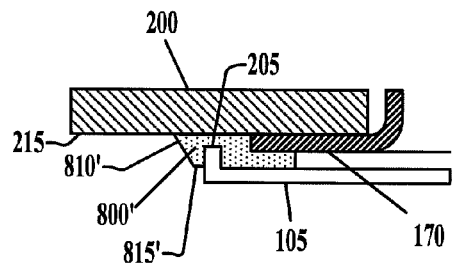
FIG. 17 is a cross-sectional view of a portion of the wall mount enclosure and an eleventh embodiment of the gasket according to the present disclosure.
Figure 18:
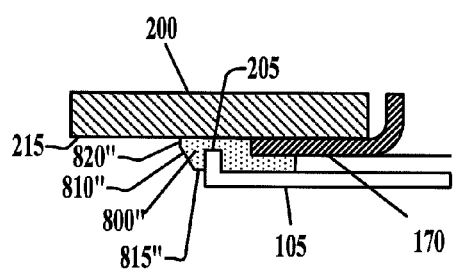
FIG. 18 is a cross-sectional view of a portion of the wall mount enclosure and a twelfth embodiment of the gasket according to the present disclosure.
Figure 19:
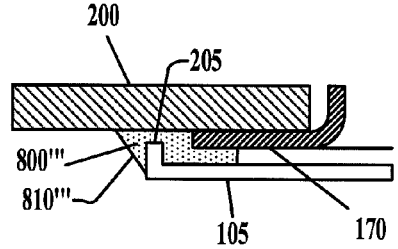
FIG. 19 is a cross-sectional view of a portion of the wall mount enclosure and a thirteenth embodiment of the gasket according to the present disclosure.

As seen in FIGS. 16-19, another embodiment of a gasket 800 is illustrated having an outer surface 805 that includes one or more flat portions. For instance, FIG. 16 shows a generally rectangular outer surface 810 of the gasket 800 with a peripheral outer side extending generally normal to the front surface 215 of the structure wall 200, and a stepped portion 815 engaging the peripheral outer side of the bent portion 205 of the door 105. FIG. 17 shows yet another non-limiting embodiment of a gasket 800' having a tapered/stepped outer surface 810', with the gasket 800' extending at an angle toward the front surface 215 of the structure wall 200 with a step portion 815' engaging the peripheral outer side of the bent portion 205. FIG. 18 shows yet another embodiment of a gasket 800" having three generally flat surfaces, including stepped portions 815''', 820''' engaging the front surface 215 of the structure wall 200 and the peripheral outer side of the bent portion of the door, with an intervening surface 810''' at an angle. FIG. 19 shows another possible implementation of a gasket 800'''' with a single angled side 810'''' extending from the peripheral outer side of the bent portion 205 of the door 105 to the front surface 215 of the structure wall 200.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An enclosure for mounting in an opening of an associated wall, the enclosure comprising:
   a housing comprising a front side, a back side and at least one side wall, the side wall extending between the front side and the back side and defining an interior that is accessible from an opening in the front side;
   a clamping apparatus to clamp the housing within the opening of the associated wall;
   a flange extending around all or at least a portion of the front side of the housing, and extending along a plane of the front side outwardly beyond the at least one sidewall, the flange having a backside at least a portion of which directly engages at least a portion of an outer surface of the associated wall when the clamping apparatus clamps the housing within the opening of the associate wall;
   a closure door operatively mounted to the enclosure in a closed position to prevent outside access through the opening in the front side, the closure door including an inwardly facing portion generally facing the associated wall around all or at least a portion of a periphery of the door; and
   a gasket engaging at least part of the inwardly facing portion of the closure door with a first portion pressed by the inwardly facing portion of the closure door when the closure door is in the closed position, the first portion including a first surface to engage the inwardly facing portion of the closure door and a second surface extending at a first non-zero angle relative to the first surface when the closure door is in an open position, the second surface extending at a smaller non-zero second angle relative to the first surface when the closure door is in the closed position to press the second surface against the associated wall to form a seal between the structure wall and the inwardly facing portion of the closure door to seal the interior of the enclosure.

2. The enclosure of claim 1, wherein, the closure door extends outwardly beyond the periphery of the flange such that the inwardly facing portion extends laterally outward of the periphery of the flange.

3. The enclosure of claim 1, wherein the gasket does not engage the flange.

4. The enclosure of claim 1, wherein the gasket includes an angled outer surface.

5. The enclosure of claim 1, wherein the gasket includes a concave outer surface.

6. The enclosure of claim 1, wherein the gasket having a cross sectional profile shape comprising:
   the first portion having a generally bulbous configuration;
   a hinge portion; and
   a second portion having a generally elongated configuration.

7. The enclosure of claim 6, wherein the first portion, the hinge portion and the second portion define a channel configured to engage at least part of the inwardly facing portion of the closure door.

8. The enclosure of claim 6, wherein the first portion of the gasket includes a convex outer surface.

9. The enclosure of claim 6, wherein the first surface and the second surface define an angle that is between 90 degrees and 130 degrees when the closure door is in the open position.

10. The enclosure of claim 9, wherein the first surface and the second surface define an angle that is about 115 degrees when the closure door is in the open position.

11. The enclosure of claim 1, wherein the gasket engages at least part of the inwardly facing closure door by surrounding at least part of the inwardly facing closure door on three sides.

12. An enclosure comprising:
   a housing defining an interior that is accessible from an opening in a front side and configured to support associated electronic equipment therein;
   a closure door operatively mounted to the enclosure in a closed position to prevent outside access through the opening in the front side, the closure door including an inwardly facing portion generally facing towards the front side around all or at least a portion of a periphery of the door, the inwardly facing portion extending laterally outward of the periphery of the opening; and
   a gasket engaging at least part of the inwardly facing portion of the closure door with a seal portion pressed by the inwardly facing portion of the closure door when the closure door is in the closed position, the seal portion including a first surface to engage the inwardly facing portion of the closure door and a second surface extending at a first non-zero angle relative to the first surface when the closure door is in an open position, the second surface extending at a smaller non-zero second angle relative to the first surface when the closure door is in the closed position to form a seal between the front side and the inwardly facing portion of the closure door to seal the interior of the enclosure.

13. The enclosure of claim 12, wherein the gasket includes an angled outer surface.

14. The enclosure of claim 12, wherein the gasket includes a concave outer surface.

15. The enclosure of claim 12, wherein the gasket having a cross sectional profile shape comprising:
   a first portion having a generally bulbous configuration;
   a hinge portion; and
   a second portion having a generally elongated configuration;
   wherein the first portion, the hinge portion and the second portion define a channel configured to engage at least part of the inwardly facing portion of the closure door.

16. The enclosure of claim 12, wherein the first surface and the second surface define an angle that is between 90 degrees and 130 degrees.

17. The enclosure of claim 16, wherein the first surface and the second surface define an angle that is about 115 degrees when the closure door is in the open position.

18. The enclosure of claim 12, wherein the gasket engages at least part of the inwardly facing closure door by surrounding at least part of the inwardly facing closure door on three sides.

* * * * *